(12) United States Patent
Ziburkus et al.

(10) Patent No.: US 12,260,372 B1
(45) Date of Patent: Mar. 25, 2025

(54) METHOD AND SYSTEM FOR PRODUCING VISUAL PRODUCT IDENTIFIERS BASED ON ACTIVE INGREDIENTS

(71) Applicant: Uniwyze, Inc., Houston, TX (US)

(72) Inventors: Jokubas Ziburkus, Houston, TX (US); Nkemdilim Okeke, Houston, TX (US)

(73) Assignee: Uniwyze, Inc., Houston, TX (US)

( * ) Notice: Subject to any disclaimer, the term of this patent is extended or adjusted under 35 U.S.C. 154(b) by 0 days.

(21) Appl. No.: 18/124,443

(22) Filed: Mar. 21, 2023

Related U.S. Application Data

(60) Provisional application No. 63/321,992, filed on Mar. 21, 2022.

(51) Int. Cl.
*G06Q 10/08* (2024.01)
*G06Q 10/087* (2023.01)

(52) U.S. Cl.
CPC .................. *G06Q 10/087* (2013.01)

(58) Field of Classification Search
CPC .... G06Q 10/087; G01N 33/15; G01N 33/948; G16H 70/40
USPC .......................................................... 705/28
See application file for complete search history.

(56) References Cited

U.S. PATENT DOCUMENTS

2017/0333505 A1* 11/2017 Gharib ................. A61K 36/185
2019/0195852 A1* 6/2019 Bryant, Jr. ......... G01N 33/0098

FOREIGN PATENT DOCUMENTS

WO      WO-2016123160 A1 *  8/2016  ............ G01N 30/68

* cited by examiner

*Primary Examiner* — Ariel J Yu
*Assistant Examiner* — Denisse Y Ortiz Roman
(74) *Attorney, Agent, or Firm* — FROST BROWN TODD LLP

(57) ABSTRACT

Botanical, plant-based products have a variety of labels and symbols that often do not represent active ingredients they contain. As described herein, this may be addressed using a method which comprises receiving active ingredient data for a product, determining a category for the product based on the received active ingredient data, generating one or more data outputs comprising an identifier for the product, and outputting the identifier for the product on a digital display of a computer which is local to a user. Other useful information, such as scores indicating interactions between product ingredients, may also be generated.

18 Claims, 5 Drawing Sheets

201

Enter your cannabinoids here:

THC: ☐ % ☐ mg/g

THCA: ☐ % ☐ mg/g

THCV: ☐ % ☐ mg/g

CBD: ☐ % ☐ mg/g

202

Enter your terpenes:

Bisabolol α-Bisabolol: ☐ % ☐ mg/g

Camphene: ☐ % ☐ mg/g

Carene Δ3-Carene: ☐ % ☐ mg/g

Cymene p-Cymene: ☐ % ☐ mg/g

Caryophyllene Beta: ☐ % ☐ mg/g

FIG. 2

METHOD AND SYSTEM FOR PRODUCING VISUAL PRODUCT IDENTIFIERS BASED ON ACTIVE INGREDIENTS

CROSS REFERENCE TO RELATED APPLICATIONS

This is a non-provisional of, and claims the benefit of, U.S. provisional patent application No. 63/321,992, filed Mar. 21, 2022, titled "Method and System for Producing Visual Product Identifiers Based on Active Ingredients," the disclosure of which is hereby incorporated by reference in its entirety.

BACKGROUND

Botanical preparations typically contain complex chemicals or ingredients. Even a single plant or fruit or product can have dozens of active chemicals. Different combinations of ingredients, their concentrations, ratios, and categorizations are complex and often do not have a standardized system of representation in numerical or visual means. Furthermore, interactions of the active molecules in the final product is what can lead to a biological medicinal, recreational, or flavor effect. However, currently, there is no effective way for this information to be represented or communicated. Thus, there is a need for improved technologies and systems which can recognize, categorize, and account for interactions of multiple active molecules in botanical preparations and, especially, those that contain ingredients with known psychotropic and intoxicating properties. Examples of such intoxicating active ingredients are alcohol, tetrahydrocannabinol, or psychedelic molecules, like psilocybin and others.

The recent expansion of availability of new intoxicating molecules, like cannabinoids and even psychedelics, exacerbates the problem of safety and efficacy and stress the need for ways to identify and categorize different preparations, especially when their regulation may be lacking or differ across state or international borders. There is a significant need for art that can process complex ingredient variations, their potencies and safety and warning profiles based on known biological mechanisms of actions and interactions, or local regulations. Those methods and systems could categorize, assign visual identifiers and scores based on ingredient relative strength, and ratios, or indication of the potential level of the psychotropic or psychedelic ingredient or effects in a product.

Thus, at the current time, there is a need in the art to produce simplified visual identifiers and assign numerical scores based on the complex active ingredients and their known mechanisms of actions and interactions.

Aspects of the disclosed technology can be used to address this and other related needs in the art.

SUMMARY

A method is provided which comprises receiving active ingredient data for a product, determining a category for the product based on the received active ingredient data and generating one or more data outputs. The one or more data outputs may comprise a visual identifier for the product wherein in some embodiments the identifier is comprised of a central portion with a perimeter and a set of segments on the perimeter and on the central portion. In some embodiments, a method takes a first segment from the set of segments on the perimeter of the central portion identified with a first ingredient and has an extent over the central portion based on a maximum percentage corresponding to the category for the product. In such an embodiment, a method is outputting the identifier for the product on a digital display, like a computer or mobile device, which is local to a user. Often according to the embodiments of the present disclosure, the central portion identifies an ingredient which has the highest concentration in the product. Also, in some embodiments, the method is determining the category for the product based on concentration of ingredients.

In some embodiments, the method comprises determining the category for the product by placing the product into a strength category from a set of predefined strength categories. Such strength categories are determined by natural limits, genetic expression level of chemicals in a product, or by regulatory requirements. Often in some embodiments, a method may be receiving from the user cutoff ranges or lower and upper limits for one or more of the strength categories. In often included embodiments, the method of determining the category comprises determining the category based on, in addition to concentration of ingredients in the product, taking into account biological attributes of the product (such as maximum achievable concentrations from botanical extracts or genetic expression limitation of active ingredients), technological attributes of the product (for example, dosages of the products or, for example, means of product preparation, as in heated or non-heated or extracted with the use of pressure versus solvents), and regulatory limitations on the product (many local, state, and national bodies regulate various amounts of active ingredients, suggesting their categorization; often lacking a unifying system of categorization, especially for cannabis and other natural products).

In certain frequent embodiments, the method may produce an identifier for the product in a shape of a first circle. In such frequent embodiments, the central portion is in the shape of a second circle which is concentric with, and has a smaller radius than, the first circle. This concentric visual identifier output can also be described as center-surround representation.

In certain frequently included embodiments, the method may be used to categorize a cannabis product. In some embodiments, cannabis product ingredients, like cannabinoids and terpenes are represented in a concentric visual symbol or identifier. In many embodiments, the method places cannabinoids on the outer perimeter and terpenes on the inner circle and places a category and hue description in the inner circle independent of the hues in the outer perimeter.

In some frequent uses, the method may calculate a score for the product based on concentrations, number and variety of active ingredients identified in the ingredient data. In many frequently used embodiments, the one or more data outputs comprises the score for the product. Thereby, complex lists of ingredients are being visually approximated into a simple visual output symbol or an identifier.

In certain embodiments, the method comprises calculating the score for each active ingredient from the active ingredient data by performing a number of steps: first, assigning a weight to that active ingredient; second-assigning an ingredient score to that active ingredient based on biological properties of a class of active ingredient which includes that active ingredient; third-generating a first intermediate score for the product based on the weights and the biological properties of the active ingredients; fourth—obtaining a second intermediate score for the product by modifying the first intermediate score for the product based on interactions between active ingredients; and fifth—obtaining the score for the product by normalizing the second intermediate score for the product onto a scale having a defined minimum and a defined maximum. In some embodiments, the defined minimum is 0 and the defined maximum is 10.

In some embodiments, the method assigns each segment from the set of segments on the perimeter of the central portion identifying a different active ingredient. In addition, the segments from the set of segments on the perimeter of the central portion are displayed differently based on the intoxicating or psychoactive nature of the active ingredients they identify. In some embodiments, each segment identifying an intoxicating or psychotropic active ingredient is displayed on a first side of the perimeter of the central portion; and, also in frequently used embodiments, each segment identifying an active ingredient which is neither intoxicating nor psychotropic is displayed on a second side of the perimeter of the central portion. In some embodiments, each segment from the set of segments on the perimeter or the central portion may be displayed with a hue having a darkness corresponding to a measure of an intoxicating or psychotropic effect of the ingredient identified by that segment. In some instances, a darker color may indicate a higher intoxicating rating of a product.

According to related embodiments herein, the visual identifier comprises a plurality of portions identifying ingredients, whereby each active ingredient is associated with a source for that ingredient; and each portion of the identifier is displayed with a color which corresponds to the source associated with the ingredient identified by that portion. In some embodiments, the method comprises: receiving, from the user, display customization information, wherein the display customization information indicates information to display in the central portion of the visual identifier and in the set of segments on the perimeter of the central portion. This allows users to customize the visual output of the identifier and to generate an updated identifier based on the display customization information from the user; and outputting the updated identifier on the display proximate to the user. Such a display can be a digital display, a computer, mobile device, or a digital screen.

In some embodiments, users can determine the upper and the lower limits for an ingredient, where the display customization information comprises one or more such cutoffs. Whereas, generating the updated identifiers comprises determining active ingredients to identify in the set of segments on the perimeter of the central portion based on the one or more cutoffs.

A system is presented here which in some embodiments is comprised of a processor and a non-transitory computer readable medium, the non-transitory computer readable medium storing instructions operable to configure the processor to perform a method comprising of receiving active ingredient data for a product; determining a category for the product based on the received active ingredient data; generating one or more data outputs, the one or more data outputs comprising an identifier for the product wherein, the identifier comprises a central portion with a perimeter and a set of segments on the perimeter of the central portion. In some embodiments, a first segment from the set of segments on the perimeter of the central portion identifies a first ingredient and has an extent over the central portion based on a maximum percentage corresponding to the category for the product; and outputting the identifier for the product on a digital display of a computer which is local to a user.

In some frequent embodiments, the system may calculate a score for the product based on concentrations, number and variety of active ingredients identified in the active ingredient data; and the one or more data outputs comprises the score for the product. Wherein calculating the score comprises of calculating it for each active ingredient from the active ingredient data: assigning a weight to that active ingredient; and assigning an ingredient score to that active ingredient based on biological properties of a class of active ingredient which includes that active ingredient. In some embodiments, it is generating a first intermediate score for the product based on the weights and the biological properties of the active ingredients. This may be followed by obtaining a second intermediate score for the product by modifying the first intermediate score for the product based on interactions between active ingredients and then obtaining the score for the product by normalizing the second intermediate score for the product to a scale having a defined minimum and a defined maximum. Wherein, the defined minimum is 0 and the defined maximum is a score of 10.

BRIEF DESCRIPTION OF THE DRAWINGS

The present disclosure, in accordance with one or more various examples, is described in detail with reference to the following figures. The figures are provided for purposes of illustration only and merely depict typical or example implementations.

FIG. 2 depicts an example of digital interface for ingredient data entry (for cannabinoids and terpenes).

The figures are not exhaustive and do not limit the present disclosure to the precise form disclosed.

DETAILED DESCRIPTION

The disclosed technology may be used to implement systems and processes that create visual representations of active ingredients in botanical and botanically derived and synthetic products.

Examples of botanical products that can be consumed via ingestion, inhalation, suppositories, tinctures, topicals, and others is cannabis. Cannabis products and/or other botanical or food products. In this context, "cannabis" products for which visual representations may be created include all *Cannabis sativa*, indica, ruderalis, and all hybrid plants, their flowers, and products derived from any part of that plant, such as stalk, roots, leaves, flowers, kolas, trichomes, seeds, and any derivatives of the naturally occurring ingredients. Cannabis products and cannabinoids (a family of natural chemicals that may be defined as chemical molecules that may have a 1,1'-di-methyl-pyrane ring, derivatized aromatic rings, and that may also contain a variedly unsaturated cyclohexyl ring and include also include their immediate chemical precursors) can be derived from hemp-type (containing less than 0.3% of intoxicating delta-9 tetrahydrocannabinol—THC) and marijuana-type cannabis products, whereby the upper limits of THC in legal cannabis products are determined by local regulatory bodies. THC is an example of one of the major phytocannabinoids. Cannabis and cannabinoid products may be cannabis flower products, and cannabis concentrates (e.g., hashish, budder, badder, shatter, diamonds, diamonds and sauce, rosin, resin, live rosin, live resin, distillate, crystalline, and other types of botanical concentrates). Examples of active ingredients in cannabis products include but are not limited to phytocannabinoids (acidic and neutral) and volatile aromatic terpene molecules, and other similar bioactive molecules, like flavonoids, and precursor meolecules. Examples of derivative chemicals from phytocannabinoids are [semi]synthetic cannabinoids that are produced from plant-derived phytocannabinoids, like delta-8 THC, delta-10 THC, THC acetate, hexahydrocannabinol (HHC), and HHC acetate to name a few. In addition to cannabis products, visual representations of non-cannabis products, such as alcoholic beverages may also be created using the disclosed technology.

Figure 1:
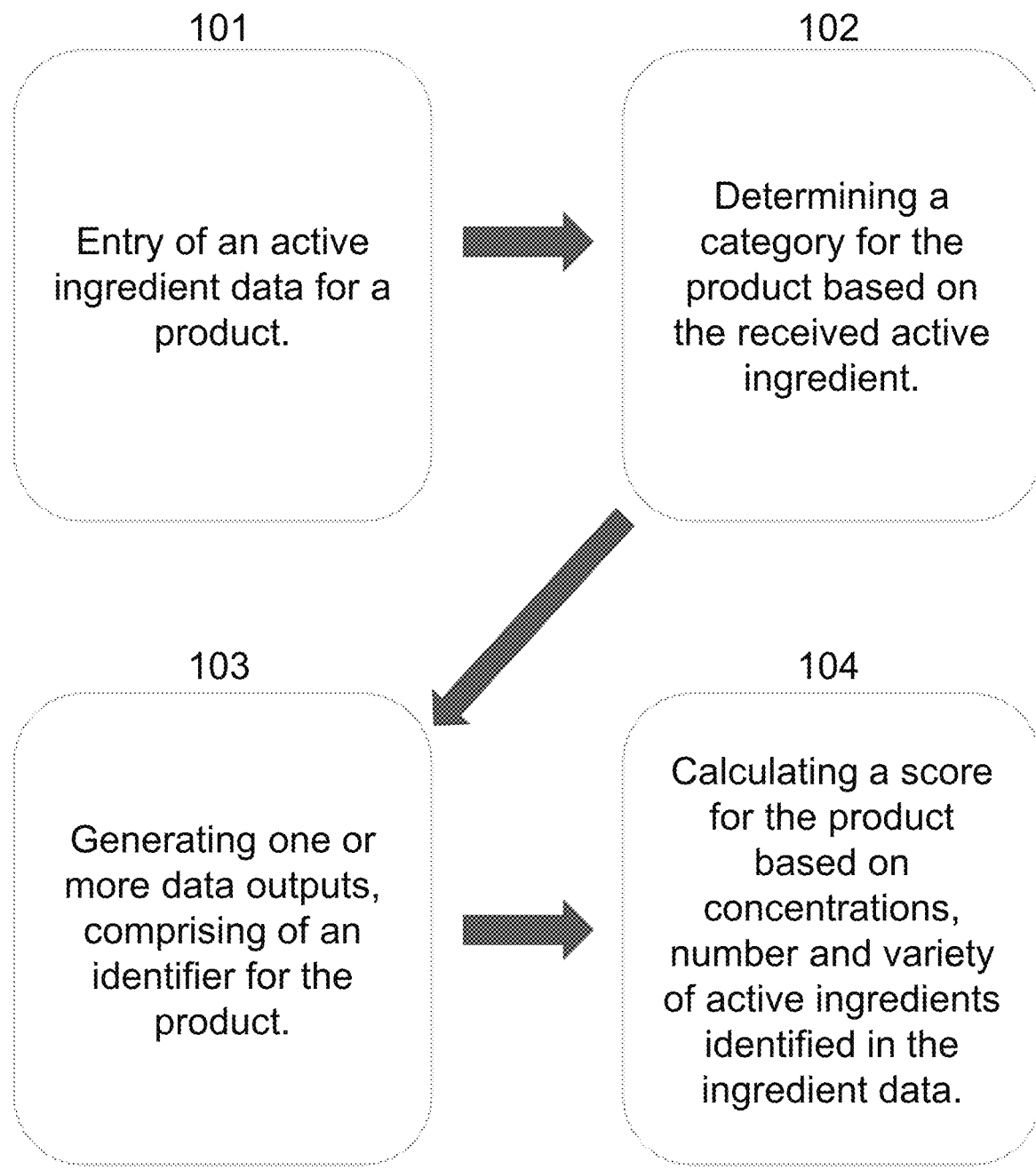
FIG. 1 depicts a schematic of the method and the system to generate ingredient data entry-based visual identifier, categorize products, and assign a numerical score.

Turning now to the figures, FIG. 1 shows a method by which a computerized system implemented based on this disclosure can generate a visual identifier and calculate a product score for a composition such as a cannabis product. Initially, in the process of FIG. 1, active ingredient data for the composition will be received (101). This may be done via a user entering the information into a user interface such as computer keyboard or another digital means, via receiving active ingredient information through an application program interface exposed by the system, or in some other manner. Following this, the method will engage a processor to determine a category for the product based on the received active ingredient data, as in (102). The processor can further generate one or more data outputs, comprising an identifier for the product (103). In some frequent embodiments, the processor instructs for an identifier to comprise a central portion with a perimeter and a set of segments on the perimeter of the central portion, whereby a first segment from the set of segments on the perimeter of the central portion identifies a first ingredient and has an extent over the central portion based on a maximum percentage corresponding to the category for the product. Such a categorization and concentric visual symbol or identifier may be displayed on a digital display of a computer or a mobile device or a digital screen, which is local to a user. In many frequent embodiments, the method may be used for calculating a score for the product based on concentrations, number and variety, mechanisms of actions and interactions of active ingredients identified in the ingredient data (104).

In some embodiments, ingredient input data may comprise the desired or known concentrations of the active ingredients, like percentage values or milligram per gram weight measurement or percentage based weight measurements (FIG. 2). In many frequent embodiments, the method is applicable for all the major categories of products. For cannabis products, these categories are typically "Flower" (cannabis flower in raw or prepared or pre-rolled formats), "Concentrates" (concentrated or extracted forms of active ingredients that are typically higher in percentages than what is in its precursor plants or other botanicals), and "Tinctures" or ingestible or edibles (formulations that specifically made for digestive tract ingestion and for vaginal suppository preparations). One of the most common forms are tinctures in bottles and for "Tincture" category we also include a volumetric calculation, whereby user can enter volume and concentration data to generate a desired visual identifier.

FIG. 2 shows an example in "Flower" category. Ingredient data input (ex. cannabinoids) by percentage concentrations of an active ingredient or by weight in milligrams per gram (mg/g) (201). The list for cannabinoids and terpenes are expandable and can be adjusted not to exceed the upper cutoff limits. In addition to cannabinoid data entries for cannabis products, ingredient data input may be terpenes (aromatic volatile molecules in cannabis flower) by percentage concentrations of an active ingredient or by weight in milligrams per gram (mg/g) (202).

In frequent embodiments, the method will be used for categories which include, but are not limited to, these major cannabis product categories-cannabis flower or flower or hemp flower or marijuana flower; cannabis food-like products or ingestible or edibles or tincture or gummies or lozenges or sublingual strips or drinks or pouches or sprays or suppositories or elixirs or tablets or pills or chewing gum; and concentrated cannabis products or concentrates or extracts or hash or rosin or resin or shatter or moonrocks or badder or budder or oil or kief or diamonds or sauce or diamonds and sauce or crystalline or pure cannabinoids or distillate or any other concentrated cold, warm, or pressed form of cannabis or otherwise extracted using chemical means. These product categories have different concentrations of the active ingredients. For example, cannabis flower has concentrations of cannabinoids on the wheel representation that cannot exceed a total of 36% of total phytocannabinoids by weight.

Cannabis and cannabinoids broadly include all strains of hemp and marijuana, and any germ, yeast, bacteria, microorganism, or mature cannabis cell produced cannabinoids and terpenes. This category also includes any botanical origin phytocannabinoids and botanical origin terpenes added to cannabis flower, which is common practice with cannabis pre-rolls. An illustrative embodiment using the disclosed technology may solve for one, two, three, four (201), five, six, seven, eight, nine, ten or more (up to infinity) phytocannabinoids, Examples of 4 phytocannabinoids: THC (delta-9 tetrahydrocannabinol), THCA (delta-9 tetrahydrocannabinolic acid), THCV (tetrahydrocannabidivarin), CBD (cannabidiol), but can also include but not limited to other available cannabinoids, such as CBDA (cannabidiolic acid), CBDV (cannabidivarin), CBG (cannabigerol), CBGA (cannabigerolic acid), CBN (cannabinol), CBC (cannabichromene), and others.

In addition to phytocannabinoids that are produced by cannabis plants, there are several semi-synthetic derivative molecules and cannabinoids that are also present in the regulated marketplace-delta-8 tetrahydrocannabinol ($\Delta$-8 THC), delta-10 tetrahydrocannabinol ($\Delta$-10 THC), THC acetate (THC-O), hexahydrocannabinol (HHC), and HHC-O. Although they can be included in the method, they are not a part of the illustrative representations here.

In some embodiments the system may use 22 common terpenes or volatile cannabis molecules. Bisabolol ($\alpha$-Bisabolol), Camphene, Carene 43-Carene, Cymene (p-Cymene), Caryophyllene Beta, Caryophyllene Oxide, Eucalyptol, Geraniol, Guaiol, Humulene ($\alpha$-Humulene), Isopulegol, Limonene ($\Delta$-Limonene), Linalool, Myrcene ($\beta$-Myrcene), Nerolidol 1, Nerolidol 2, Ocimene ($\beta$-Ocimene), Ocimene (Ocimine), Pinene ($\alpha$-Pinene), Pinene ($\beta$-Pinene), Terpinene ($\alpha$-Terpinene), Terpinene ($\gamma$-Terpinene), Terpinolene. In the most reductionist form, the system may assign only one color by solving for the highest concentration terpene that has been entered into the list of the twenty-three. The algorithm may be adjusted and expanded to include more than one color representation of the terpenes. Terpenes in Flower category can be entered by a known or desired percentage value or a milligram per gram (mg/g) values that are commonly used in commercial applications.

Figure 3:
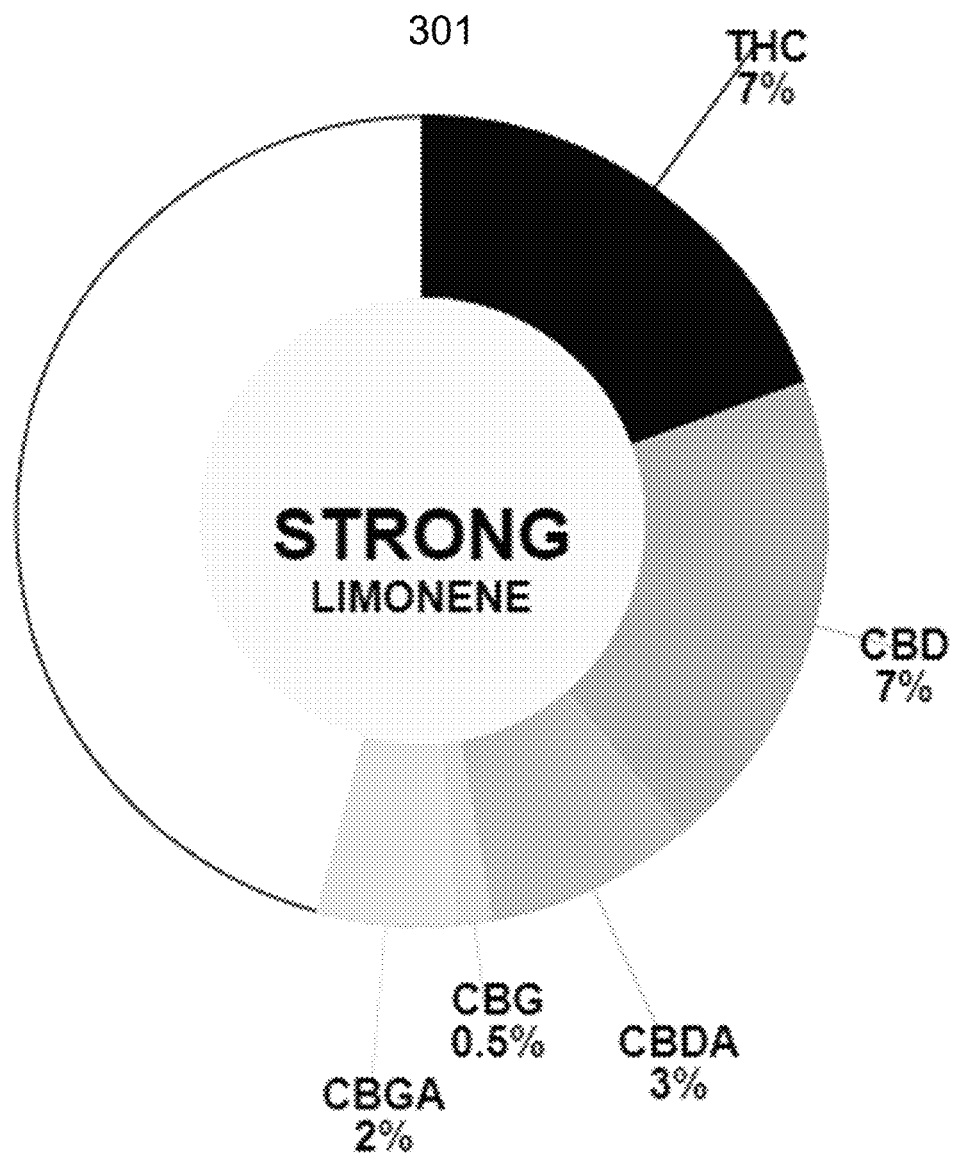
FIG. 3 depicts an example of the simplified concentric visual identifier and an alternative box-like display of all entered cannabinoid and terpene ingredients.

In some embodiments, as in FIG. 3, active ingredient variables (input data) are coded within a wheel-like or concentric geometry, where the most prevalent active ingredients comprising larger portions (arcs of the wheel) may be depicted in a grayscale pattern and the center portion of the wheel containing a color representation might depict another type of active ingredient in the product (301). For example, in some embodiments, phytocannabinoids are depicted by the arcs in the wheel. In some embodiments, the middle of the wheel may represent one, two, or more terpenes represented by different colors, or a flavor color assigned by the user. In some embodiments, the system allows users to create and search for a simple and easily recognizable visual identifier by entering the known or desired active ingredient composition of a product. In some embodiments in which it is present, the visual identifier display might be operable to display a digital image representation in the form of the wheel and arcs where it might represent the active ingredients from cannabis, like phytocannabinoids. In some other embodiments, the method can produce visual identifiers that may represent alcohol levels in beer, wine, and/or liquor. In some frequent embodiments, a user may choose to display all entered ingredients and their percentage concentrations (or other values) into small box formats that will correspond to the entries displayed on the concentric identifier (202). This illustrates an example, where the concentric, wheel-like visual identifier contains only one, the highest concentration terpene in the center portion, and the boxes below provide the full set of all the ingredient entries. This is an example of how this method and system may be used to create a simple and easily recognizable visual identifier of complex active ingredient data within the product by users interactively changing data entries [201-202]. In some embodiments custom APIs can be built for any business or analytical laboratory to enter the analytical measurement data of active ingredients into the system to generate a simple visual identifier without losing any data entry information.

In some embodiments, users may seek to identify a product based on strength categorization, whereby the active ingredients or the overall product identifier may be displayed within certain prior assigned strength categorizations based on the concentration ranges of the active ingredients in that product. In some embodiments, the product strength categorization is based on biological and/or the allowable limits of the actives in the consumable products. In some embodiments, the system can be used to enter any number of phytocannabinoids and non-cannabinoid molecules (like but not limited to terpenes, flavonoids, and ethanol) and may be customized and the algorithm is editable. In some embodiments, the strength of the product category may be displayed on the visual identifier, inside the wheel of the identifier or listed below the wheel. In some embodiments, terpene algorithm assigns only one color by solving for the highest concentration of the dominant terpene from the entered or desired list of terpenes. In some embodiments, multiple or all terpenes (or other active ingredients) are presented in colors and displayed within the center of the wheel in full color (301), or depicted using a color gradient, where individual terpene/molecule strength is represented by full intensity color and the less dominant terpenes can be depicted using a less intense strength of hue and/or in a color gradient pattern. In other embodiments, the color code of the ingredients in the arc and the center of the wheel can be custom modified to match desired user setting or specific regulatory restrictions.

Thus, the active ingredient code in the system is designed in such a way that it allows users to select for all the cannabinoid combinations in the peripheral arcs of the wheel and one or more dominant terpene colors in the center wheel. This reductionist visual representation code of one color for the most dominant terpene is a feature that allows consumers to easily recognize the most prevalent terpene/flavor/ingredient in the products (206). This feature in the code is malleable and terpene number can be increased to infinity. This feature can also assign more than one color to the center of the wheel and present colors in a color gradient, where the most dominant and concentrated active ingredient is displayed in the full color hue occupy a proportionately larger space within the wheel. Whereas smaller concentration ingredients will occupy smaller space within the center of the wheel and their color hues may be displayed in a gradient-like fashion.

Figure 4:
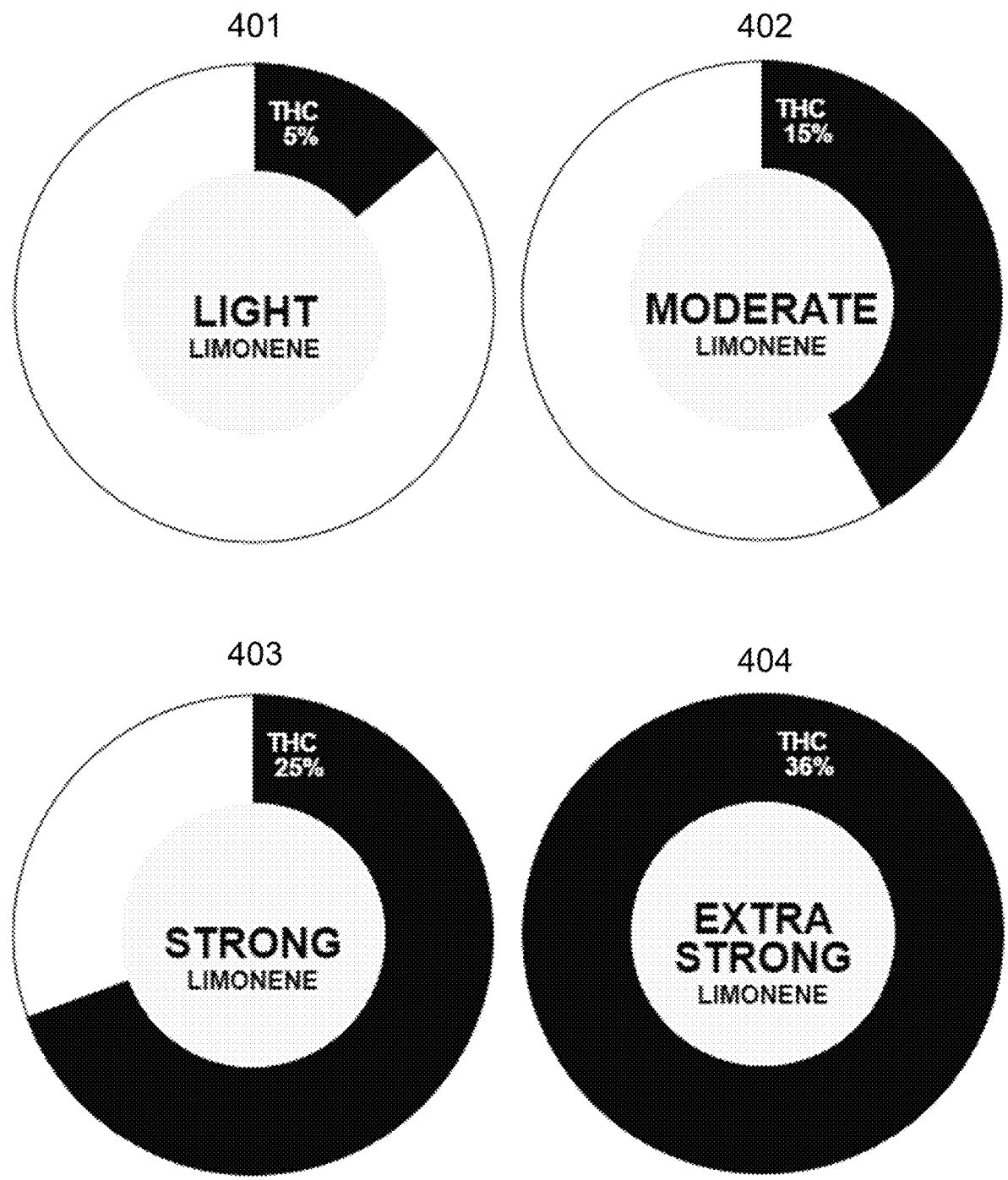
FIG. 4 depicts examples of categorization of the strength of the product based on the strength or the total concentration of cannabinoids within a total allowable limit determined by user within an example perimeter of the circle.

In frequently used embodiments, the system may segment products based on the concentration of intoxicating ingredients into strength categories (light, moderate, strong, and extra strong). This categorization is based on the known biological genetic expression properties of certain active ingredients or permitted limits of active ingredients by different regulatory agencies, that often places products within different categories. As shown in FIG. 4, for illustrative purposes, cannabinoid concentrations that may fall within, but not limited to, a specific range of 0 to 5 percent total cannabinoid concentration are defined as "light" (401). Concentration of cannabinoids above 5 and up to 15 percent, but not limited to this range, may be defined as "moderate" (402). The percentage range of cannabinoids above 15 and up to 25 percent, but not limited to this range, may be defined as "strong" (403). "Extra strong" category (404) may define all flower products that contain total cannabinoids above 25% with the upper cutoff limit of 36 percent. The 36 percent cutoff limit for the "Flower" category segments the outer perimeter arcs into 360 degrees, each arc capable of depicting cannabinoids at their concentrations and may be displayed on a concentrically shaped visual identifier. This upper limit in an example is determined based on the scientific literature of the maximal cannabinoid percentage expression in cannabis plants.

"Flower" category commercialized products may include but are not limited to: all Cannabis sativa, indica, ruderalis, and hybrid cannabis flower and flower products, like pre-rolls, pre-packaged flower inhalation pods, or any other form of fresh, dried, or otherwise processed cannabis flower or cannabis biomass.

Figure 5:
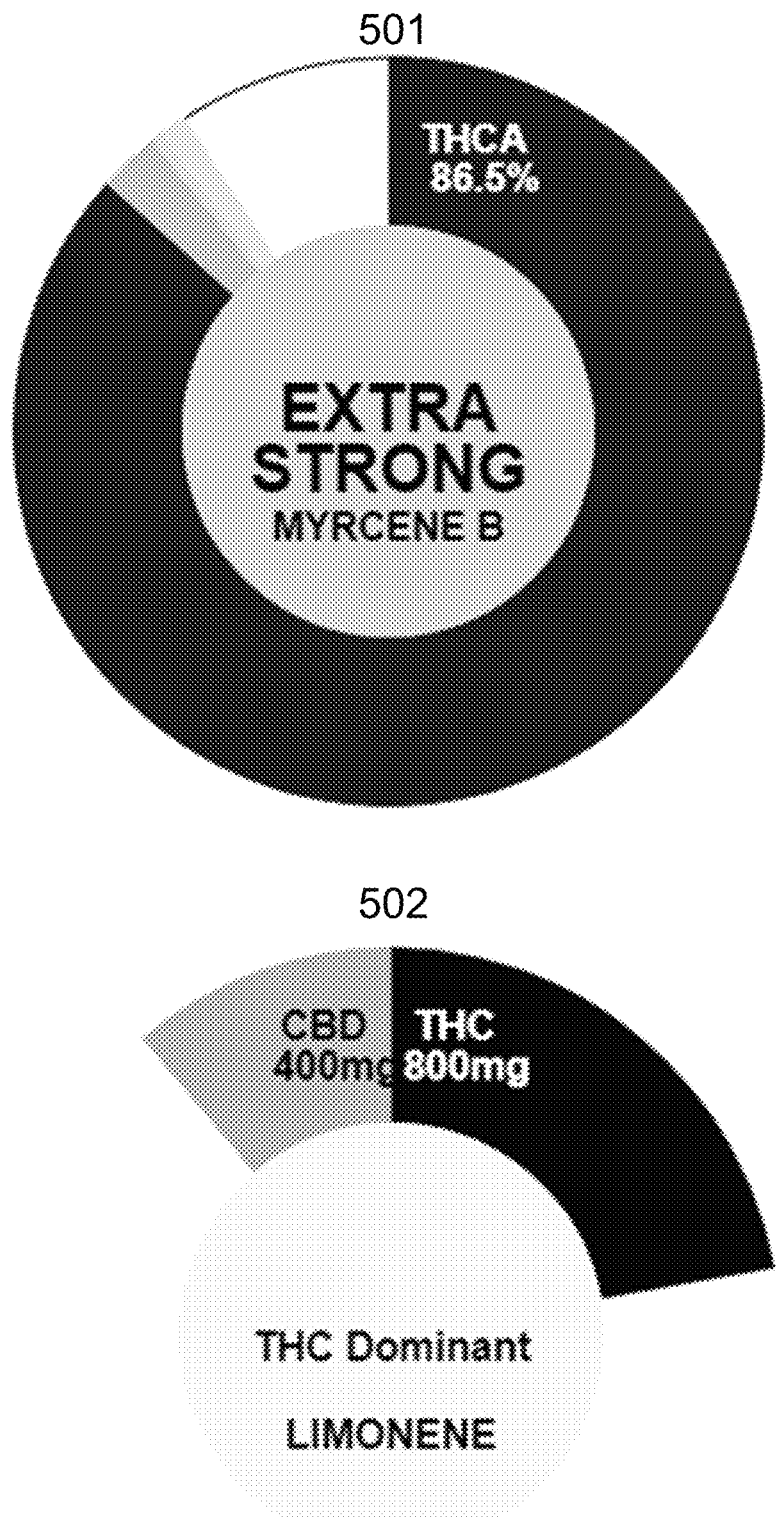
FIG. 5 depicts examples of visual identifiers for concentrated (concentrates) and for ingestible (tinctures) cannabis products.

As illustrated in FIG. 5 With the higher concentrations of ingredients in the "Concentrates" category, the maximum concentration of total cannabinoids in the arcs of a wheel is set at 100%. 501 illustrates an example of 86.5% THC product that would exceed the cutoff for the "Flower" category (401-404) in comparison to 36% in "Flower" category). The reason for this is that the concentrated preparations also include pure isolates of an active ingredient, which can be 100 percent pure. In many embodiments of this art, the "Tinctures" category, or ingestible products (also to include topical products in this category) are typically regulated, sold, and dosed differently and in some embodiments the maximum of total cannabinoids by weight is 3600 mg (502). Examples of code and visual identifier display variations for concentrated and ingestible product categories.

"Concentrate" product category can include any product that has higher concentrations of active ingredients and, thus, may fall within a distinct subcategory. For example, compared to "Flower" category, total available cannabinoid percentages are capped at 100%, or pure, isolate form of a chemical. By selecting a "Concentrates" category, the algorithm adjusts calculations and visual output automatically to a different concentration than for flower. The center of the wheel may display product strength category ("Extra strong") and the most dominant terpene entry in a single-color background ("myrcene b"-beta myrcene). Active ingredients are displayed within the arcs of the wheel, other ingredient labels are not included in this example.

"Tincture" product category can include any ingestible product and, thus, may fall within a distinct subcategory. For example, compared to "Flower" and "Concentrates" categories, intoxicating cannabinoids are displayed on the right and non-intoxicating on the left of the wheel. In some embodiments, the system may be adjusted to have the maximum total concentrations of active ingredients in milligrams to a total of thirty-six hundred milligrams of, in this example, cannabinoids. By selecting a "Tinctures" category, the system adjusts calculations and visual output automatically to a different calculation (by weight or by volume). For "Tincture" category entries, the system may contain built in weight and volume measurement converters. In some embodiments, this can be used by entering the total amount of an active ingredient (for example "Total cannabinoids (mg)" or total available cannabinoids that are typically listed in milligrams in ingestible products-mg; for example—1200 mg) and volume of a product (for example, "Total volume (ml)"-fifteen milliliters or 15 ml). Active ingredient data can be entered as a percentage value (% box), a weight-based milligram value (mg box), or a weight per volume-based value (mg/ml box) and based on the total cannabinoid amount and volume entries, the system automatically calculates and displays information all three boxes. The system is built in such a way that based on data entries in %, mg, or mg/ml. Percentages may automatically display calculations in mg and mg/ml values. And any box entry will calculate values for the other boxes. The center of the wheel may display the most dominant cannabinoid—"THC Dominant" and terpene-limonene (502) in a single-color background in the center of the wheel. Active ingredients are displayed within the arcs of the wheel, other ingredient labels are not included in this example. The algorithm in this example displays intoxicating ingredients on the right side and non-intoxicating ingredients on the left side of the wheel, as ingestible products are also typically sold in ratios. In some embodiments, a ratio of the two or three most dominant ingredients can also be included in the center of a wheel.

Various regulatory authorities may limit the upper and lower limits or cutoffs of certain ingredients, including those that have psychotropic and intoxicating properties. For example, one state legislature may set an upper limit for total available THC in a cannabis product not to exceed 1 percent, while in other jurisdictions this limit may be different or not exist at all and be dependent on the technological and biological attributes and sourcing of a given ingredient.

Additionally, certain embodiments might comprise a method to derive the entourage score which may be based on the formula that calculates this score digitally from the desired or entered data entry points for the active ingredients or strength categories within the arcs of the wheel or the center display of the wheel. In certain embodiments the system may be used to calculate and display only the individual entourage score for either the terpenes or only for the cannabinoids, or a combination of both. In some embodiments where system might be used to calculate the total entourage score, the sum of the terpene entourage score and phytocannabinoid entourage score can be used. In some instances, the system embodiments may be used to calculate the total entourage score and assign the Entourage Score (ES) of 0 to 10. Zero (0) being the lowest ES and ten (10) being the highest possible score. In some embodiments the system may be used whereby the ES is based on the concentrations and diversity of the active ingredients and their biological properties where the score assignments might be based on an assigned weight and multiples of that weight based on the specified concentrations of the listed or entered active ingredients. In some embodiments, the weights and multiples used for the final calculation of the ES can be adjusted. In some instances, the weight and multiple assignments for each active ingredient used to calculate the entourage score, can be based on near real-time updates on the newest published literature on the biological, medical, intoxicating, or, otherwise any known effects reported on that active ingredient. In some embodiments, the weight and multiple assignments could be linked to an artificial intelligence engine via a custom application programming interface (API).

In some embodiments, a separate portion of the algorithm assigns a proprietary Entourage Score (ES) or ingredient variety and potency score of 0 to 10. Zero (0) being the lowest ES and ten (10) being the highest possible score. The ES may be based on the diversity of the active ingredients and their biological properties, known mechanisms of actions and interactions. Products that contain and list a greater variety of active ingredients may have a higher entourage score. However, in some embodiments, a diverse set of active ingredients in a product may modulate or even oppose each other's physiological properties. Despite containing a diverse set of active ingredients, some of these products may receive lower entourage scores or may have negative impacts. The entourage scores for cannabinoids are assigned according to a weight-based system. The weight of each cannabinoid (or terpene) is based on the known biological properties of the entered active ingredients, or elements. For cannabinoids, the following weight values (which can be altered and given different ranges and thresholds) may be used: 1) THC—1, 2) THCA—0.7, 3) THCV—0.3, 4) CBD—0.7, 5) CBDA—0.3, 6) CBDV—0.3, 7) CBG—0.5, 8) CBGA—0.3, 9) CBN—0.5, 10) CBC—0.3 and also can for example include semi-synthetic available cannabinoids—11) delta-8 THC—0.4, 12) delta-10 THC—0.2, and 13) THC-O—1.3.

Terpenes may be assigned weight values based on their known biological, clinical, and analytical properties. The terpene weight assignment may use, but not be limited to the following weight values: 1) α-Bisabolol—0.175; 2) Camphene—0.125; 3) Carene or Δ3-Carene—0.075; 4) Cymene or p-Cymene—0/075; 5) Caryophyllene Beta—0.25; 6) Caryophyllene Oxide 0.175; 7) Eucalyptol—0.125; 8) Geraniol—0.125; 9) Guaiol—0.075; 10) α-Humulene—0.075; 11) Isopulegol—0.075; 12) Limonene or Δ-Limonene—0.25; 13) Linalool—0.25; 14) Myrcene or β-Myrcene—0.25; 15) Nerolidol 1—0.075; 16) Nerolidol 2—0.05; 17) β-Ocimene—0.075; 18) Ocimine—0.075; 19) Pinene α—0.25; 20) β-Pinene—0.2; 21) α-Terpinene 0.1; 22) γ-Terpinene—0.1; 23) Terpinolene—0.175.

In this fashion, 68% (6.8 out of 10) of the Entourage Score is attributed to the total sum of the thirteen cannabinoids and 32% (3.2 out of 10) of the total weight of the score is summed across 23 listed terpene assigned values. In some embodiments, to get any ES assigned (a minimal positive score of 1), there must be at least 0.3% of cannabinoids and at least 0.2% of terpenes. This is called a Cannabinoid and Terpene threshold. In some instances, the algorithm may double the score for the assigned value.

Cannabinoid weight multiples: THC-like molecules: As in the above table, one point is assigned for up to or equal total 10% (0.3-10.55% concentration of these cannabinoids: THC, THCA, Delta-8, THCO, Delta-10. An additional point is assigned for each additional 10%: Weight multiple ranges: From 0.3% (0.256%) up to 10.055%—is 1 ES; From 10.056% up to 20.055%—is 2 ES; From 20.056% up to 30.055%—is 3 ES; From 30.056% to 36%—is 4 ES. In this logic, for example, 10.2% THC gets assigned 2 points; and 16% THC gets assigned 2 points, 23%—3 points; and 35.5-4 points.

CBD-like molecules. As in the above table, one point is assigned for up to or equal total 4% concentration of these cannabinoids: CBD and CBDA. An additional point is assigned for each additional 4%. Weight multiple ranges: From 0.3% (0.256%) up to 4.055%—is 1 ES; From 4.056% up to 8.055%—is 2 ES; From 8.056% up to 12.055%—is 3 ES; From 12.056% to 16.055%—is 4 ES; From 16.056% to 20.055%—is 5 ES; From 20.056% to 24.055%—is 6 ES; From 24.056% to 28.055%—is 7 ES; From 28.056% to 32.055%—is 8 ES; From 32.056% to 36.055%—is 9 ES.

As in the above table, one point is assigned for up to or equal total 2% concentration of these cannabinoids: CBG and CBGA. An additional point is assigned for each additional 2% (starting from 3.55% which rounds up to 4% and then additional point at 5.55%, etc.). In this logic, for example, 2% CBG gets assigned 1 point; 3.8%—2 points, and 5.8% CBD gets assigned 3 points. CBG-like molecules. Weight multiple ranges: From 0.3% (0.256%) up to 2.055%—is 1 ES; From 2.056% up to 4.055%—is 2 ES; From 4.056% up to 6.055%—is 3 ES; From 6.056% to 8.055%—is 4 ES; From 8.056% to 10.055%—is 5 ES; From 10.056% to 12.055%—is 6 ES; From 12.056% to 14.055%—is 7 ES; From 14.056% to 16.055%—is 8 ES; From 16.056% to 18.055%—is 9 ES. CBG and CBGA are rarer than CBD-like molecules. To obtain higher levels of CBG-like molecules, cannabis plant has to be harvested earlier in their grow cycle. At that early stage of the maturity, the plants will not be producing their maximal levels of cannabinoids, like CBG/A. Currently, the highest reported percentage of CBG/A in cannabis plants is around 7%.

For THCV, CBN, CBC, THCV, CBDV, As and similar molecules, one point may be assigned for up to or equal total 1% concentration of these cannabinoids: THCV, CBN, CBC, THCV, CBDV. An additional point may be assigned for each additional 1%. Weight multiple ranges: From 0.3% (0.256%) up to 1.055%—is 1 ES; From 1.056% up to 2.055%—is 2 ES; From 3.056% up to 4.055%—is 3 ES; From 4.056% to 5.055%—is 4 ES; From 5.056% to 6.055%—is 5 ES; From 7.056% to 8.055%—is 6 ES; From 9.056% to 10.055%—is 7 ES. Cannabinoid varin-like molecules are currently very rare, so their doubling score has the lowest concentration brackets (every 1%).

Terpene weight multiples. Terpenes weight assignment ranges: From 0.2% (0.156%) up to 1.055%—is multiple of 1; From 1.056% up to 2.055%—is multiple of 2 (times 2); From 2.056% up to 3.055%—is multiple of 3; From 3.056% to 4.055%—is multiple of 4. Examples: Limonene, which has a weight of 0.25 whereby a 3.2% is equal to ES of 1 (0.25×4). Terpinene, which has a weight of 0.1 whereby 3.2% is equal to ES of 0.4 (0.1×4). Terpene, like cannabinoid, weights are based on known biological and therapeutic properties and prevalence of the molecules in the currently available cannabis plants. But this knowledge is dynamic. The algorithm can be adjusted in weights, if the total added weights of all listed terpenes, independent of their concentrations, is within the 32% total weight of the entourage effect.

The system may be described as sequential algorithm solutions: 1) Cannabinoid and terpene weight assignments: Using the distinct cannabinoid and terpene scoring logic, the algorithm first assigns weighted values based on the threshold and incremental increases in the concentrations. 2) Assignment of the preliminary ES: The next step, algorithm computes the cannabinoid and terpene weight values for each listed element concentration and produces a preliminary ES score for each element. 3) Calculation of the final ES score: In this third step-algorithm calculates and assigns any additional weighted value points (any possible multiples based on the entered concentrations). This calculates the FINAL ES score that can be listed as separate cannabinoid or terpene score, or as a combined TOTAL ES.

In some embodiments, the system may convert all the entered data into the data entry page linked to the algorithm that generates the wheel and color outputs, including the visual representation of the wheel arcs and the color inside the wheel into a scannable quick response code (QR code). The QR code can call up all the data. In some embodiments, the system is accessible to users online and may be a functional subscription-based e-commerce system or subscription widget/tool online. In some embodiments, users may enter the data online and see the functional output of the algorithm displayed digitally. In some embodiments, examples of data entries and the visual outputs are available to users. In some embodiments, users can subscribe to the functional algorithm and have access to the interactive interface, being able to enter the data into all the sections of the algorithm. In other embodiments, the users may choose to download the digital or print an analog copy of a visual identifier. In other embodiments, users can use the visual identifiers to sell or find products based on the desired active ingredients. Users may be able to utilize a single segment (for example just the wheel in greyscale, just the wheel and color inside the wheel, just the entourage score, any customized text and number entries, or any combination of therefore of, or the entire algorithm for their purposes, as in above segmentation description.

In some embodiments, users have access to all the data history that has been entered under their account into the algorithm to generate the visual identifiers. In some embodiments, the data server can regenerate the visual identifiers, or the data entries can be exported as numbers.

In some embodiments the system might also be connected to digital accessories, such as but not limited to application programming interfaces (API), search engine optimization interfaces and extensive botanical product data and consumer data bases and consumer search data bases in broad and local geographical locations. In these instances, the embodiments in the system may be used for the user to conjure up, find, identify, advertise, or display a desired product in a particular geographical location. The advantage here over the other systems is that the visual identifier embodiment might be used easily by the users to either categorize or identify the same or similar products based on the active ingredients or strength categories, or ratios, or entourage score, or terpene color(s), independent on the of the local regulatory labels, or confusing individual producer and varied branded name products. In some embodiments, users of this system can search the database and interactive interface to find and further facilitate discovery of matching products based on an active ingredient composition in a geographical area of a user.

An equivalent and in some embodiments, this system can also be applied to alcohol products, whereby there are also distinct product categories based on the strength of intoxicating ingredients. Whereas, beer has the lowest alcohol percentage, wine has higher alcohol, and liquor the highest alcohol percentage, close to 100% pure. In this case, the arcs of the wheel would indicate the strength of alcohol and the middles of the wheel would designate a terpene or flavor or name of a grape for wine or hop for beer or the main basis of fermentation or ingredient for liquor.

The invention claimed is:

1. A method comprising:
   a) receiving analytical active ingredient data for a psychoactive product;
   b) determining, from a plurality of strength categories, a strength category for the psychoactive product based on the received analytical active ingredient data;
   c) determining, from a plurality of product categories, a product category for the psychoactive product;
   d) determining a maximum active ingredient percentage for the psychoactive product based on the determined product category for the psychoactive product, wherein the maximum active ingredient percentage is a total maximum possible measurable amount of active ingredients as determined by genetic and/or chemical output studies for products in the product category for the psychoactive product;
   e) dynamically displaying a first indicator in a center region of a product identifier region, the first indicator representing the strength category for the psychoactive product;
   f) dynamically displaying a second indicator in a corresponding perimeter region of the product identifier region, the second indicator representing an active ingredient identified in the analytical active ingredient data, the perimeter region corresponding to the second indicator having a side on a corresponding portion of the center region's perimeter, wherein the side of the perimeter region corresponding to the second indicator which is on the corresponding portion of the center region's perimeter has a length which is determined dynamically based on:
      i) the maximum active ingredient percentage for the psychoactive product; and
      ii) a percentage of the active ingredient represented by the second indicator in the psychoactive product; and
   wherein:
   A) the method comprises:
      I) converting the first and second indicators and the received analytical active ingredient data, into a QR code; and
      II) prior to dynamically displaying the first and second indicators, receiving a signal from a QR code reader indicating that the QR code has been scanned; and
   B) the acts of dynamically displaying the first indicator and dynamically displaying the second indicator are performed based on receiving the signal from the QR code reader.

2. The method of claim 1, wherein:
   a) the analytical active ingredient data for the psychoactive product comprises a first set of active ingredients and a second set of active ingredients;
   b) the active ingredient represented by the second indicator is comprised by the first set of active ingredients; and
   c) the first indicator identifies an ingredient from the second set of active ingredients which has a highest concentration of the ingredients comprised in the second set of active ingredients in the psychoactive product.

3. The method of claim 1, wherein determining the strength category for the psychoactive product based on the received analytical active ingredient data comprises determining the strength category based on concentration of active ingredients.

4. The method of claim 3, wherein the method comprises receiving, from a user, cutoff ranges for one or more strength categories from the plurality of strength categories.

5. The method of claim 3, wherein determining the strength category comprises determining the strength category based on, in addition to concentration of ingredients, biological attributes of the psychoactive product, technological attributes of the psychoactive product, and regulatory limitations on the psychoactive product.

6. The method of claim 1, wherein:
   a) the center region of the product identifier region is in a shape of a first circle;
   b) the perimeter region corresponding to the second indicator is in a shape of an arc of a second circle which is concentric with, and has a greater radius than, the first circle.

7. The method of claim 1, wherein:
   a) the psychoactive product is a cannabis product;
   b) the plurality of product categories comprises:
      i) cannabis flower and cannabis flower products;
      ii) cannabis concentrates and extractions;
      iii) cannabis oils and tinctures and ingestible preparations;
   c) determining, the maximum active ingredient percentage for the psychoactive product comprises executing instructions stored on a non-transitory computer readable medium programmed to:
      i) based on determining that the product category for the psychoactive product is cannabis flower and cannabis flower products, determine that the maximum active cannabinoid and other active ingredient percentage is up to thirty six percent;
      ii) based on determining that the product category for the psychoactive product is cannabis concentrates and extractions, determine that the maximum active ingredient percentage is up to one hundred percent; and
      iii) based on determining that the product category for the psychoactive product is cannabis oils and tinctures, determine that the maximum active ingredient percentage based on a ratio of weight of active ingredient to volume of product included in the received analytical active ingredient data.

8. The method of claim 1, wherein:
   a) the method comprises calculating a score for the psychoactive product based on concentrations, number and variety of active ingredients identified in the analytical active ingredient data; and
   b) the method comprises displaying the score for the psychoactive product on a digital display of a user.

9. The method of claim 8, wherein the method comprises incorporating artificial intelligence to calculating the score for the psychoactive product by, using an artificial intelligence engine, assigning weights to active ingredients identified in the analytical active ingredient data based on effects reports for the active ingredients, the weights being applied with biological properties of active ingredients identified in the analytical active ingredient data to generate a first intermediate score for the psychoactive product, the first intermediate score for the psychoactive product being modified to obtain a second intermediate score for the psychoactive product based on interactions between active ingredients, and the score for the psychoactive product being obtained based on mapping the second intermediate score for the product onto a scale having a predefined minimum and maximum.

10. The method of claim 1, wherein:
 a) the analytical active ingredient data:
  i) identifies a set of active ingredients which comprises the active ingredient represented by the second indicator;
  ii) for each active ingredient in the set of active ingredients, provides a proportion of the psychoactive product made up by that active ingredient;
 b) dynamically displaying the second indicator is comprised by a set of one or more acts comprising, for each active ingredient in the set of active ingredients, dynamically displaying an indicator representing that active ingredient in a corresponding perimeter region of the product identifier region; and
 c) for each active ingredient in the set of one or more active ingredients, dynamically displaying the indicator representing that active ingredient comprises dynamically displaying the perimeter region corresponding to that indicator differently based on the psychoactive or psychoactive nature of the active ingredient Arepresented by the indicator corresponding to that perimeter region.

11. The method of claim 10, wherein:
 a) each perimeter region corresponding to an indicator representing an intoxicating or psychoactive active ingredient is displayed on a first side of the perimeter of the center region; and
 b) each perimeter region corresponding to an indicator representing an active ingredient which is neither intoxicating nor psychotropic is displayed on a second side of the perimeter of the center region.

12. The method of claim 10, wherein each perimeter region corresponding to an indicator representing an active ingredient is displayed with a hue having a darkness corresponding to a measure of an intoxicating or psychotropic effect of the ingredient identified by that segment.

13. The method of claim 10, wherein:
 a) each active ingredient is associated with a source for that ingredient; and
 b) each perimeter region corresponding to an indicator representing an active ingredient is displayed with a color which corresponds to the source associated with the active ingredient represented by the indicator corresponding to that region.

14. The method of claim 1, wherein the method comprises:
 a) receiving, from a user, display customization information, wherein the display customization information indicates information to display in the center region of the product identifier region and in each perimeter region of the product identifier region;
 b) regenerating the first and second indicators on the display customization information from the user; and
 c) dynamically displaying the regenerated first and second indicators on a display proximate to the user.

15. The method of claim 14, wherein:
 a) the display customization information comprises one or more cutoffs; and
 b) regenerating the first and second indicators comprises determining whether the active ingredient represented by the second indicator should be included based on the one or more cutoffs.

16. A system comprising a processor and a non-transitory computer readable medium, the non-transitory computer readable medium storing instructions operable to configure the processor to perform a method comprising:
 a) receiving analytical active ingredient data for a psychoactive product;
 b) determining, from a plurality of strength categories, a strength category for the psychoactive product based on the received analytical active ingredient data;
 c) determining, from a plurality of product categories, a product category for the psychoactive product;
 d) determining a maximum active ingredient percentage for the psychoactive product based on the determined product category for the psychoactive product, wherein the maximum active ingredient percentage is a total maximum possible measurable amount of active ingredients as determined by genetic and/or chemical output studies for products in the product category for the psychoactive product;
 e) dynamically displaying a first indicator in a center region of a product identifier region, the first indicator representing the strength category for the psychoactive product;
 f) dynamically displaying a second indicator in a corresponding perimeter region of the product identifier region, the second indicator representing an active ingredient identified in the analytical active ingredient data, the perimeter region corresponding to the second indicator having a side on a corresponding portion of the center region's perimeter, wherein the side of the perimeter region corresponding to the second indicator which is on the corresponding portion of the center region's perimeter has a length which is determined dynamically based on:
  i) the maximum active ingredient percentage for the psychoactive product; and
  ii) a percentage of the active ingredient represented by the second indicator in the psychoactive product; and
wherein
A) the method comprises:
 I) converting the first and second indicators and the received analytical active ingredient data, into a QR code; and
 II) prior to dynamically displaying the first and second indicators, receiving a signal from a QR code reader indicating that the QR code has been scanned; and
B) the instructions stored on the non-transitory computer readable medium are operable to configure the processor to perform the acts of dynamically displaying the first indicator and dynamically displaying the second indicator based on receiving the signal from the QR code reader.

17. The system of claim 16, wherein:
 a) the method comprises calculating a score for the psychoactive product based on concentrations, number and variety of active ingredients identified in the analytical active ingredient data; and
 b) the method comprises displaying the score for the psychoactive product on a digital display of a user.

18. The system of claim 17, wherein the method comprises incorporating artificial intelligence to calculating the score for the psychoactive product by, using an artificial intelligence engine, assigning weights to active ingredients identified in the analytical active ingredient data based on effects reports for the active ingredients, the weights being applied with biological properties of active ingredients identified in the analytical active ingredient data to generate a first intermediate score for the psychoactive product, the first intermediate score for the psychoactive product being modified to obtain a second intermediate score for the psychoactive product based on interactions between active ingredients, and the score for the psychoactive product being obtained based on mapping the second intermediate score for the product onto a scale having a predefined minimum and maximum.

\* \* \* \* \*